Figure 1:
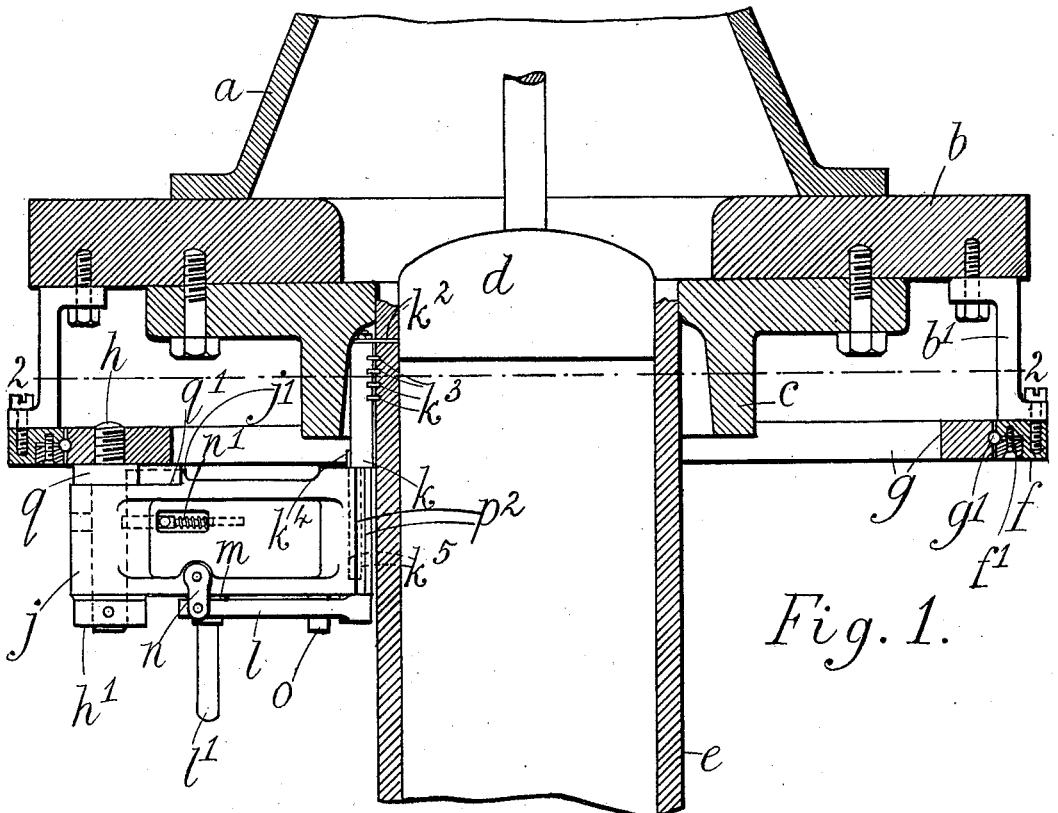

No. 759,402. PATENTED MAY 10, 1904.
R. STANLEY.
APPARATUS FOR USE IN CONNECTION WITH THE MANUFACTURE
OF SANITARY OR OTHER LIKE PIPES.
APPLICATION FILED JULY 11, 1902.
NO MODEL. 4 SHEETS—SHEET 1.

Witnesses:
Harry T. P. Lee.
F. F. Meadows.

Inventor:
R. Stanley.
By Stanley Pappenmure
Attorneys.

No. 759,402. PATENTED MAY 10, 1904.
R. STANLEY.
APPARATUS FOR USE IN CONNECTION WITH THE MANUFACTURE
OF SANITARY OR OTHER LIKE PIPES.
APPLICATION FILED JULY 11, 1902.
NO MODEL. 4 SHEETS—SHEET 2.

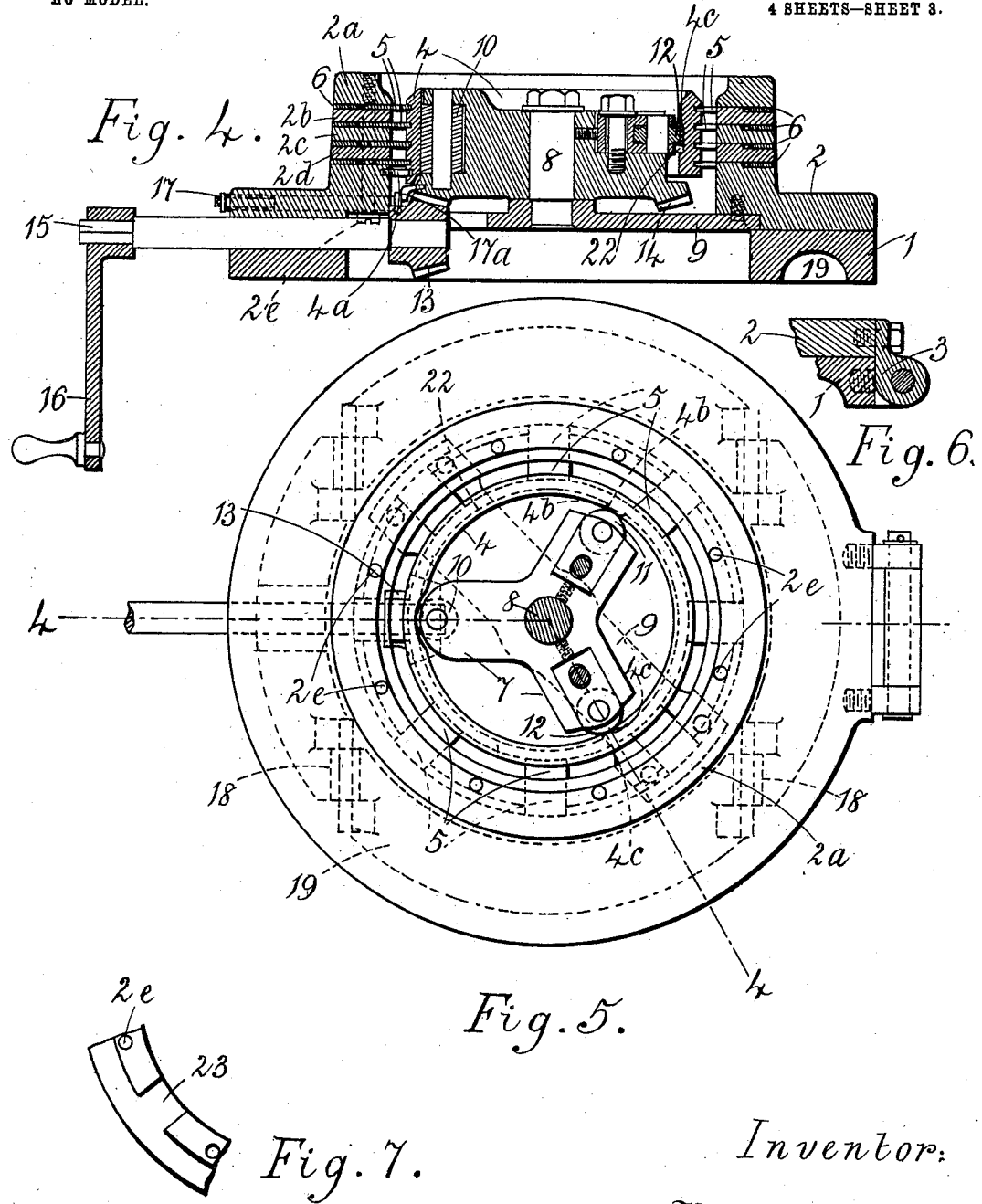

No. 759,402. PATENTED MAY 10, 1904.
R. STANLEY.
APPARATUS FOR USE IN CONNECTION WITH THE MANUFACTURE
OF SANITARY OR OTHER LIKE PIPES.
APPLICATION FILED JULY 11, 1902.
NO MODEL. 4 SHEETS—SHEET 4.

Witnesses:
Harry Y. P. Gee.
F. F. Meadows

Inventor:
R. Stanley.
By Stanley Poppenhusen
Attorneys.

No. 759,402.                                                     Patented May 10, 1904.

UNITED STATES PATENT OFFICE.

REGINALD STANLEY, OF NUNEATON, ENGLAND.

APPARATUS FOR USE IN CONNECTION WITH THE MANUFACTURE OF SANITARY OR OTHER LIKE PIPES.

SPECIFICATION forming part of Letters Patent No. 759,402, dated May 10, 1904.

Application filed July 11, 1902. Serial No. 115,216. (No model.)

*To all whom it may concern:*

Be it known that I, REGINALD STANLEY, a subject of Edward, King of Great Britain and Ireland, residing at Manor Court, Nuneaton, in the county of Warwick, England, have invented certain new or Improved Apparatus for Use in Connection with the Manufacture of Sanitary or other Like Pipes, of which the following is a specification.

This invention relates to the manufacture of sanitary and other like pipes molded from plastic clay by means of an extrusion-press; and it consists of certain new or improved apparatus for performing one or any or all of the following operations, namely: the severing of the butt or barrel of the pipe after it has been just expressed from the machine, the grooving of the outside of the butt, the lubricating of the inside of the outer socket-die, and also the grooving of the interior of the socket of the pipe.

The invention is intended specially for attachment to a pipe-machine in which the socket is first formed by pressing clay from the feed-cylinder by the downward pressure of a plunger working from a steam, hydraulic, or other power cylinder and piston or by the action of pug-knives or other mechanical means. The clay first enters the socket-mold formed by the closed outer and inner socket-dies, and when this is filled the socket-ring and carrying-table are released, allowing the barrel of the pipe to be expressed to the desired length, when it is stopped by the automatic action of the valve which cuts off the steam or other power and exhausts the cylinder, a stop under the table assisting to make the length exact.

The apparatus comprised in the present invention consists of independent devices for cutting and grooving the butt (but also lubricating the outer socket-die) and for grooving the pipe-socket. That part which deals with the butt consists chiefly of a tool in the form of a rod carrying a cutter and groovers, which is brought into action when the pipe has been expressed, but before it has been removed. At such a stage it has been customary heretofore to sever the pipe by passing a wire across. According to the present invention, however, the rod above mentioned, mounted upon a hinged bracket by means of which it is swung round up to the face of the pipe, is introduced up within the outer socket-die, entering the space just vacated by the descended socket. The cutter and groovers which project sidewise from the said rod and are situated at and near its top are kept out of contact with the pipe until the tool is at the proper height, when the rod is turned on its axis, and the cutter and groovers are thereby forced into the substance of the pipe. The tool is then swung completely around the pipe upon a special carrier. The tool also carries a lubricator, or the lubricator may be mounted on another rod, so that not only is the pipe severed and annular grooves formed in same, but the inner surface of the socket-die is lubricated in readiness for the molding of the next pipe. The other part of this invention relating to the grooving of the socket, such grooves, in combination with the grooves upon the butt, being for keying the cement at the junction when the pipes are laid, consists of a special arrangement for forcing plates, such as rings or segments, into the substance of the pipe-socket and withdrawing them again into recesses in the inner socket-die.

Figure 3:
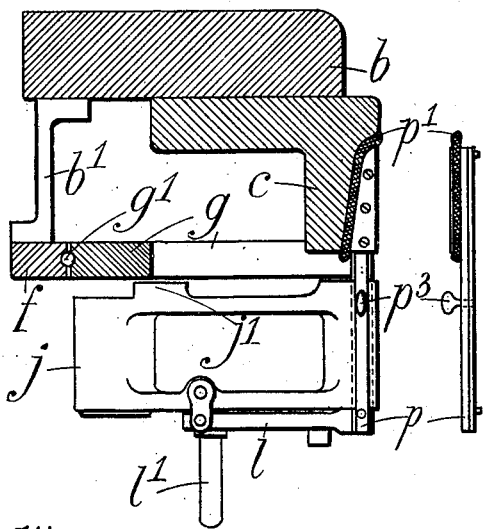
Figure 2:
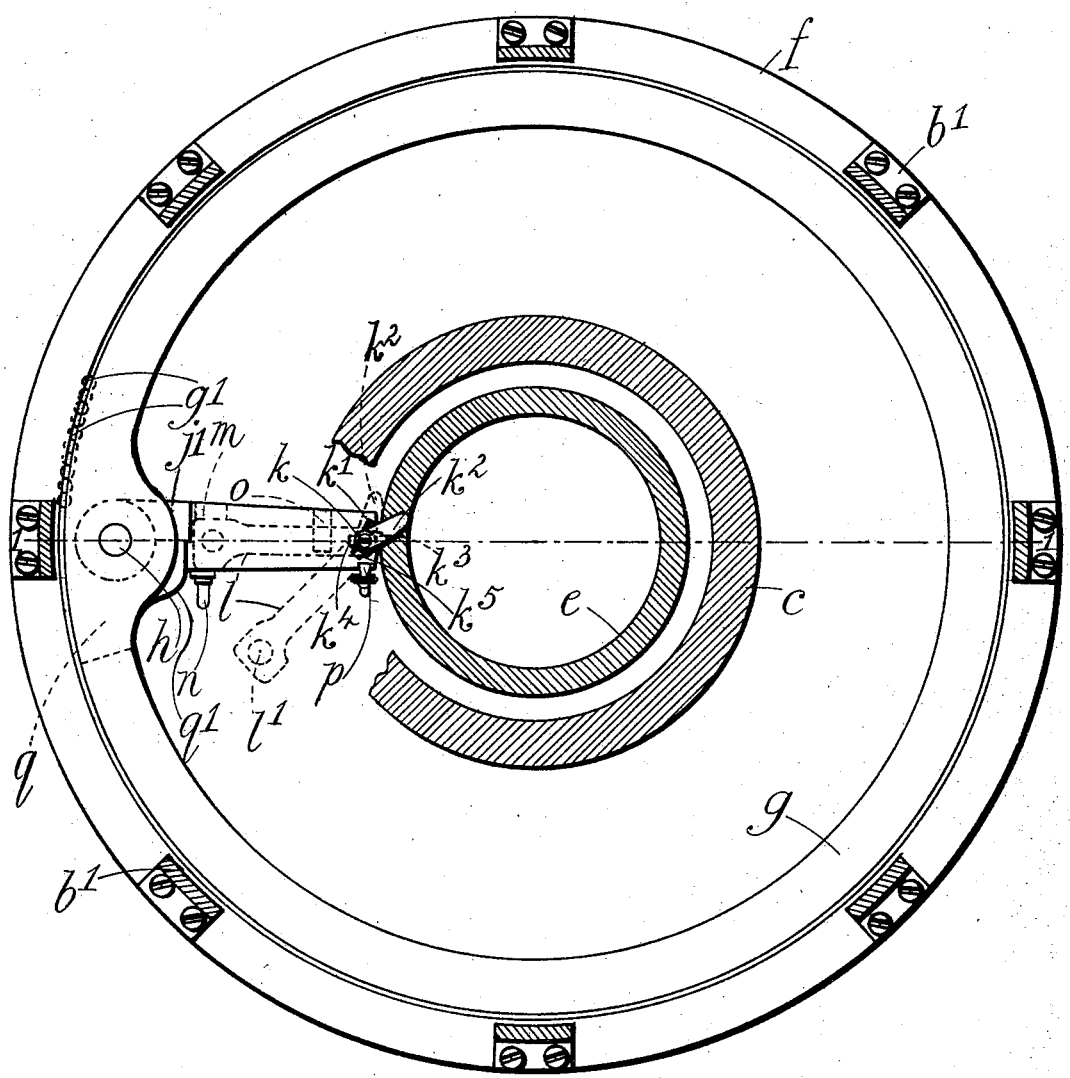
Figure 8:
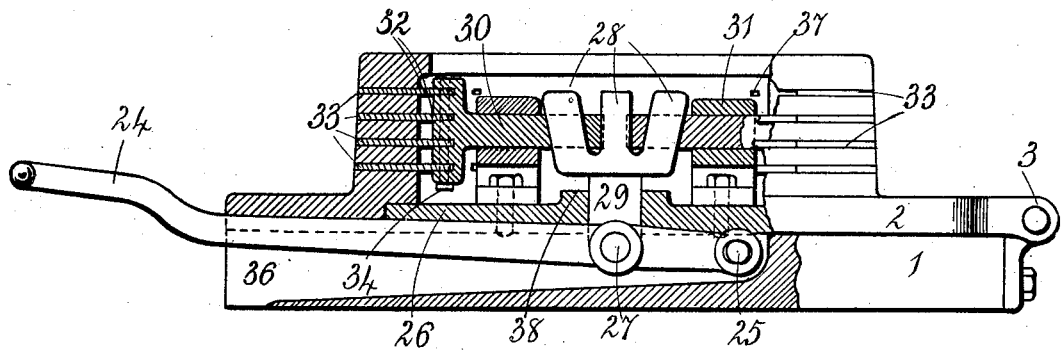
Figure 9:
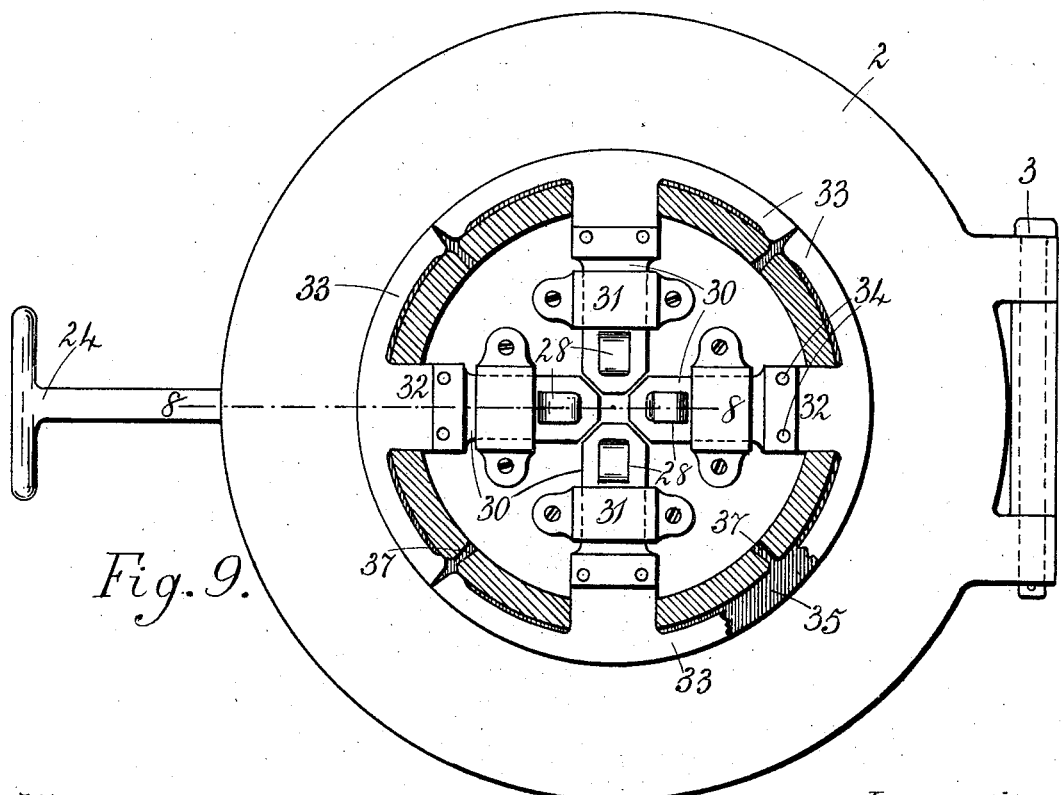

The accompanying drawings illustrate the invention, Figure 1 being a vertical section on line 1 1 of Fig. 2 through the mouth of an extrusion-press containing the mechanism for dealing with the butt-end of the pipe, showing, however, the bracket and tool in elevation, and Fig. 2 being a section on line 2 2 of Fig. 1. Fig. 3 shows a part of Fig. 1 with the addition of the lubricating device. Fig. 4 is a vertical section on the angular line 4 4 of Fig. 5 through the inner socket portion of the press, showing the mechanism for grooving the socket end of the pipe, Fig. 5 being a plan of same. Fig. 6 shows the hinge of the socket-plate in vertical section. Fig. 7 shows part of one of the rings which compose the inner socket-die shown in Figs. 4 and 5. Fig. 8 is a sectional elevation on line 8 8 of Fig. 9, showing an alternative mechanism for grooving, and Fig. 9 is a plan of Fig. 8.

Referring to Figs. 1, 2, and 3, $a$ is the ordinary mouthpiece of an extrusion-press, and $b$ the plate for carrying the outer socket-die $c$. $d$ is the core, and $e$ the molded pipe. $f$ is a fixed ring suspended from plate $b$ by brackets $b'$ and supporting a revoluble ring $g$ by means of balls $g'$, working in a groove therein. $f'$ is an adjustable ring fastened upon the under side of ring $f$ by screws, the two combining to form an adjustable outer ball-race for the balls $g'$. $h$ is a pivot-pin screwed fast into ring $g$ and bearing a radial bracket $j$, capable of turning upon same and held by a collar $h'$, cottered to end of pivot-pin. The free end of the radial bracket $j$ is bored vertically to receive a tool-bar $k$, bearing at its top a horizontally-projecting knife $k^2$ and a little distance below four or any other suitable number of groovers $k^3$. A radial arm $l$, having a handle $l'$, is provided on the lower end. The hole in the bracket containing the tool-bar $k$ is grooved, at at $k'$, to the required depth for receiving the groovers $k^3$ and also grooved, as at $k^5$, for receiving a feather $k^4$ on the bar $k$, the groovers $k^3$ and feather $k^4$ dropping into their respective grooves when the bar is turned axially and lowered, thus keeping the cutter and groovers away from the pipe until they are purposely raised and swung round. $m$ is a stop on the bracket $j$ for the handle $l'$, and $n$ is a drop-catch pivoted to the bracket for locking the handle in position. $n'$ is a spring-bolt for locking the bracket $j$ to pivot $h$ during the cutting and grooving operation. $o$ is a gapped bracket for receiving arm $l$ and assisting feather $k^4$ in the support of the bar $k$.

In Figs. 1, 2, and 3, $p$ is a dovetailed sliding strip let into a groove $p^2$ in the bracket $j$ and bearing an oily pad $p'$. A plate $q$ is carried on the pin $h$ close up against the ring $g$, the plate being cut away or shaped so as to form a stop $q'$ for the radial bracket $j$, which has a raised stop-piece $j''$ to engage with same.

The action of the apparatus (shown in Figs. 1, 2, and 3) is shortly as follows: While the clay is being expressed in the form of a pipe the bracket $j$ is kept quite free from the same by being swung upon the pivot $h$. At the conclusion of the pressing the bracket is swung round again into the position shown on the drawings, the stops $j''$ and $q'$, as well as the spring-bolt $n'$, retaining it during the continuance of the operation. The tool-bar $k$ is now lifted by its arm $l$ or handle $l'$, and the dovetailed sliding strip $p$ is raised and secured by the set-screw $p^3$ until the tops of the bar $k$ and strip $p$ are high up within the outer socket-die $c$, when the feather $k^4$ being clear of the groove the bar is rotated axially through a short arc of a circle by the swinging of the arm $l$ into position under the bracket $j$, to which it is then locked by the drop-catch $n$. The knife $k^2$ and groovers $k^3$ on bar $k$ and oily pad $p'$ being now in cutting and grooving and lubricating positions, the ring $g$ is swung completely round on its ball-bearings, the result being that the butt of the pipe is severed and also grooved and the inner face of the outer socket-die $c$ is lubricated. The arm $l$ is then swung on one side again to set the groovers free, the bar $k$ and strip $p$ are lowered, and the bracket swung quite clear of the pipe, which is now completed so far as the butt-end is concerned.

Referring to Figs. 4, 5, and 6, which deal with the grooving of the socket end of the pipe, 1 represents a base-plate upon which is carried the inner socket-die 2, hinged thereto by a hinge 3, as shown in Figs. 5 and 6. 4 is a forcing-ring situated within the inner socket-die 2 and prevented from rotating by a stop $4^a$, which may be screwed into the substance of the socket-die, as shown. 5 5 5 are forcing-plates fixed at suitable intervals in the forcing-ring 4, and butting against the inner face of the grooving plates or rings 6 6 6, which lie within recesses in the inner socket-die, normally remaining flush therewith. For convenience in fitting the grooving plates or rings 6 and plates 5 the die 2 is divided into stepped rings or layers $2^a$, $2^b$, $2^c$, and $2^d$, (a detail of one of said rings or layers being shown in Fig. 7,) which are laid upon one another and secured together by screws $2^e$, gaps 23 being formed horizontally through the step or thick portion for receiving forcing-plates 5, which slide between such rings or layers and also in the gaps. The rings 6 are forced outwardly at one point at a time by a forcing-roller inside, which is caused to travel around the inside of the inner socket-die by internal mechanism described below, the diametrically opposite portions of the rings consequently sinking horizontally within the grooves of the die 2. Centrally within the die 2 a three-armed carrier 7 is mounted upon a pivot 8, supported by a cross-plate 9, screwed upon the under side of the socket-die 2. Said carrier 7 carries a forcing-roller 10 and releasing rollers 11 and 12. 13 is a pinion gearing with circular rack 14 for revolving the carrier 7, said pinion being mounted on a shaft 15, rotated by a handle 16 or other suitable means. 17 is an indicator for showing whether the grooving-rings 6 are in or out of action. The base-ring 1 is capable of being moved from place to place on rollers 18, fitted within the channel 19 underneath same. $4^b$ and $4^c$ are projections situated within a groove 22, within which said rollers 11 and 12 work. The manner of working of this part of the invention is as follows: At the conclusion of one operation and commencement of another the rings 6 lie quite flush in the grooves of the die 2, thus offering no obstruction to the entry of the clay when the die is lifted up by the table in the usual way. The forcing-roller 10 then lies in a shallow recess in the ring 4, as shown more clearly in Fig. 5. Upon the completion of the pressing of the socket of the pipe and after the pressure has been released the carrier 7 is rotated by means of the handle 16. The forcing-roller 10 thereupon leaves its recess in the forcing-ring 4 and commences to force the latter outwardly. The effect of this is to cause the grooving-rings 6 to project at the points opposite the roller 10, owing to the inward pressure on them transmitted by the forcing-plates 5. This action continues around the whole circumference until the carrier 7 has made a full revolution, when the rings will be returned to their original positions by the rollers 11 and 12 (on different levels) riding upon the projections $4^b$ and $4^c$, which being within a recess, as shown, are missed by the roller 10 as it passes along the ring 4. The indicator 17 will now be forced a little outward by the stud $17^a$ on the carrier pushing against it, thus insuring that the rings 6 are returned to the face of the inner socket-die before the pipe is attempted to be removed. The removal is done by rolling the whole a little to one side on the carrying-rollers and then tipping up the socket-die 2 on the hinge 3, leaving the base 1 and gear 13 meanwhile stationary.

The arrangement shown in Figs. 8 and 9 differs from that shown in Figs. 5 and 6 in that the grooving plates or rings are divided into segments and are operated on the wedge principle. 24 is a lever loosely fulcrumed at 25 to the plate 26, which is secured to the base of the inner socket-die 2. Pivoted at 27 to lever 24 is a quadruple wedge composed of four prongs 28 28, having a square neck 29, working snugly within the plate 26. 30 30 are radial arms slotted at their inner ends to receive the prongs 28 and working within guides 31, supported on plate 26. The outer ends of the arms 30 are enlarged and slotted horizontally to receive the ends of the radial pieces 32, which form part of or are attached to the segmental plates or pieces 33 (shown broken away in Fig. 9) and are secured to the arms 30 by bolts or pins 34. The socket-die 2 can in this case be formed in one piece, grooved, as at 35, to about half its depth to receive the plates or segments 33 and horizontally gapped to receive the pieces 32. 36 is a gap in the base 1, extending partly into the socket-die 2, in which the lever 24 works. 37 represents holes within the socket-die grooves and are provided for the escape of any clay which may pass between the ends of the segments 33 or for the escape of air from the clay when the socket is being formed. This arrangement is operated by depressing the lever 24, which carries down with it the wedge 28, and consequently forces outward the arms 30 and segments 33. The shoulder 38 limits the downward movement of the wedge, and consequently determines the depth of the grooves formed in the socket of the pipe by the segments. By raising the lever and wedge to the position shown on the drawings the arms and segments are returned inward, and by further raising the lever the socket-die 2 is tilted back on its hinge 3, so that the pipe can be removed.

Obviously I may employ any convenient number of segments and a wedge with any suitable number of prongs.

Having thus described my invention, what I claim is—

1. In a machine of the kind specified, means for externally grooving the butt-end of the pipe before it leaves the die, comprising a revoluble ring about the mouth of the machine, means for supporting said ring, a swinging bracket attached to the ring, and means upon said bracket adapted to externally groove said butt-end.

2. In combination with extrusion-machines for the manufacture of sanitary and other like pipes, a pad for lubricating the upper socket-die ring, a strip upon which said pad is carried, and a horizontally-swinging bracket, having a groove in which said strip is held at the required height and within which it can be raised and lowered at will, and means for moving said bracket in a concentric path around said socket-die ring.

3. In combination with extrusion-machines for the manufacture of sanitary and other like pipes a vertical tool-bar having a number of studs projecting from it near its upper end and adapted to enter the substance of the barrel of the molded pipe, a horizontally-swinging bracket bored vertically to receive said tool-bar and means for raising and lowering said tool-bar and turning it axially, also means for moving said bracket in a concentric path around the pipe-barrel for externally grooving the same.

4. In a machine of the kind specified means for severing the butt-end of the pipe before it leaves the die, comprising a revoluble ring about the mouth of the machine, means for supporting said ring, a swinging bracket attached to said ring and means upon said bracket adapted to sever said butt-end.

5. In a machine of the kind specified, means for lubricating the inside face of the outer socket-die $c$ comprising a revoluble ring about the mouth of the machine, means for supporting said ring, a swinging bracket attached to said ring, and means upon said bracket adapted to lubricate said outer socket-die.

6. In a machine of the kind specified, means for impressing grooves within the socket of the pipe, comprising a peripherally-grooved inner socket-die, plates within same for impressing, means for forcing out said plates from and also for withdrawing them into said peripheral grooves, for the purpose set forth.

In witness whereof I have hereunto set my hand in the presence of two witnesses.

REGINALD STANLEY.

Witnesses:
 THOS. DAVIS,
 ALBERT NEWEY.